United States Patent
Gieray et al.

(10) Patent No.: US 7,971,669 B2
(45) Date of Patent: Jul. 5, 2011

(54) METHOD FOR CONTROLLING AN OUTPUT TORQUE OF AN ELECTRIC VARIABLE TRANSMISSION BY BATTERY POWER MANAGEMENT

(75) Inventors: Claus Gieray, Stuttgart (DE); Birgit Loschko, Hochdorf (DE)

(73) Assignee: Daimler AG, Stuttgart (DE)

( * ) Notice: Subject to any disclaimer, the term of this patent is extended or adjusted under 35 U.S.C. 154(b) by 322 days.

(21) Appl. No.: 12/417,141

(22) Filed: Apr. 2, 2009

(65) Prior Publication Data

US 2010/0252344 A1     Oct. 7, 2010

(51) Int. Cl.
*B60W 20/00*     (2006.01)
(52) U.S. Cl. .................................... 180/65.29
(58) Field of Classification Search ............... 180/65.21, 180/65.22, 65.25, 65.29; 903/906, 907, 909, 903/930, 945
See application file for complete search history.

(56) References Cited

U.S. PATENT DOCUMENTS

| | | |
|---|---|---|
| 6,868,318 B1 | 3/2005 | Cawthorne et al. |
| 6,946,818 B2 | 9/2005 | Cawthorne et al. |
| 7,076,356 B2 | 7/2006 | Hubbard |
| 2006/0048988 A1 | 3/2006 | Dreibholz et al. |
| 2008/0236912 A1* | 10/2008 | Ueoka et al. ............. 180/65.2 |

FOREIGN PATENT DOCUMENTS

| | | |
|---|---|---|
| DE | 10 2005 006 369 A1 | 9/2005 |
| DE | 10 2004 043 589 A1 | 4/2006 |
| EP | 0 868 055 B1 | 1/2008 |
| JP | 2002291104 A | 10/2002 |

* cited by examiner

*Primary Examiner* — Paul N Dickson
*Assistant Examiner* — Robert A Coker
(74) *Attorney, Agent, or Firm* — Crowell & Moring LLP

(57) ABSTRACT

In a method for controlling an output torque of an electric variable transmission having an input coupled to a combustion engine and at least one electric motor that is at least feedable by a battery and able to recuperate energy into the battery, the battery power is limited to a maximum continuous battery power when the transmission is in a stationary operating point with a continuous revolution speed. The battery power is increased and limited to a maximum transient battery power that is greater than the maximum continuous battery power in a non-stationary operating point, upon a request for changing the gear-ratio (ratio between transmission input and output-speed) or upon a request for changing the transmissions output revolution speed.

13 Claims, 3 Drawing Sheets

# METHOD FOR CONTROLLING AN OUTPUT TORQUE OF AN ELECTRIC VARIABLE TRANSMISSION BY BATTERY POWER MANAGEMENT

BACKGROUND AND SUMMARY OF THE INVENTION

The invention is directed to a method for controlling an output torque of an electric variable transmission.

Continuously variable transmissions (CVT) are transmissions in which the ratio of the rotational speeds of input and output shafts of a vehicle or other machine can be varied continuously within a given range.

An electric variable transmission (EVT) allows for CVT action by using more than one power input to produce a single output, and is a popular method for transmitting power in hybrid vehicles, enabling an Internal Combustion Engine (ICE) to be used in conjunction with motor/generators for vehicle propulsion, and having the ability to control the portion of the mechanical power used directly for propelling the vehicle and the portion of mechanical power that is converted to electric power and recombined to drive the vehicle. At least one of the power inputs is an electric motor.

An EVT is usually designed with a differential gear system performing a "power-split" function, by which a portion of the mechanical power is connected directly through the transmission and another portion is split off for subsequent conversion to electrical power via a motor/generator. In a differential gear with three input/output shafts the rotational speed and the torque of each shaft is determined by the rotational speed and torque of both of the other shafts. For instance in a car when one wheel is running free (e.g., when the car is jacked up) the other wheel of the same axis connected to the same differential gear will not produce traction when the engine is running. Also when both wheels are jacked up and the input shaft kept from rotating by stopping the engine, rotating one wheel will cause the other one to rotate in the opposite direction with the same revolution speed. When a differential gear is used in an EVT the revolution speed of the transmission output can be controlled by direction and ratio of the rotations of all input shafts. This means the car equipped with the EVT may be accelerated by accelerating the combustion engine or the electric motor while the respective other propulsion unit is kept at the same revolution speed.

The EVT and power sources are controlled to provide a balance between the power sources that increases vehicle fuel economy while providing advantageous performance when needed. The EVT may also be used to provide electrically generated power to charge large storage batteries for subsequent electric motor propulsion as needed, or to convert vehicle kinetic energy to electricity through 'regenerative braking' during deceleration. Various configurations of power generation, usage and balance can be implemented with a EVT, enabling great flexibility in propelling hybrid vehicles.

The maximum and minimum transmission output power of the EVT depends on the variation of energy of the inertias in the power train. In dynamic state the transmission power output may therefore fluctuate heavily, or may be subject to discontinuities, since part of the energy is required for changing the revolution speed against the inertia effects, which are significant due to the relatively high masses involved. These discontinuities may appear inconvenient to the car's driver and passengers.

German patent document DE 10 2005 006 369 discloses a method in which minimum and maximum battery powers are given in data sets correlated to battery conditions such as charging state, temperature, battery voltage and battery usage.

German patent document DE 10 2004 043 589 discloses a method for determining a traction power distribution in a hybrid vehicle, wherein a potential battery power is determined from the actual charging state, the set charging state, characteristic charging power limits and discharging power limits of the battery depending of the driving style (the so called sportivity index), a value for a minimum and a maximum charging state and the minimum and maximum power of the combustion engine.

U.S. Pat. No. 6,946,818 discloses a method of providing closed-loop control of power flowing into and out of an electrical energy storage system, including the steps of: determining a charge power limit comprising a maximum charge power during each of a plurality of control loops; determining a discharge power limit comprising a maximum discharge power during each of the plurality of control loops; comparing the charge power limit and the discharge power limit during each of the plurality of control loops; and providing a charge power limit output and a discharge power limit output for use in a subsequent control loop, which are based upon the charge power limit and the discharge power limit. The charge power limit output and discharge power limit output are equal to the discharge power limit and charge power limit, respectively, when the discharge power limit is greater than the charge power limit; and the charge power limit output and discharge power limit out-put are selected from the group consisting of the charge power limit, the discharge power limit and zero, when the discharge power limit is less than or equal to the charge power limit.

U.S. Pat. No. 6,868,318 discloses a method for improving the performance of an energy storage system that incorporates a high density electrical energy storage device, such as a battery or ultracapacitor. The method may be implemented in an energy storage system of a hybrid electric vehicle (HEV) as a computer control algorithm for controlling the discharge power limits of an energy storage device, such as a battery. The method allows the discharge power limits of the battery to be temporarily expanded under vehicle launch conditions where the power demands are high, thereby making additional stored energy available for use under such conditions by improving battery utilization and providing more consistent vehicle launch characteristics than would otherwise be available.

Japanese patent document JP 2002291104 discloses a vehicle battery controller in which the limit values of residual capacity and temperature are stipulated to control the charging and discharging of the battery 7. The charging and discharging are controlled by the controller 3 in such a way that the residual capacity and temperature do not exceed the limit values. Also, a pedal angle detector 2 is provided to detect the angle of an accelerator pedal 1. Based on the detected results of the amount and change speed of the angle of the accelerator pedal, the controller 3 determines whether or not acceleration is operated. When accelerated, the limit is relaxed for discharging by the residual amount and temperature.

European patent document EP 0 868 005 discloses an arrangement for powering a driving shaft. The difference between the output power of a combustion engine and a target power is acquired by an electric motor with a pair of rotors that may rotate independently, and thus determine the power drain or power output of the electric motor. The arrangement comprises first and second correction devices for correcting the target power of the engine. When the battery is charged or discharged with electric power out of a predetermined range the target power of the drive shaft is corrected.

One object of the present invention is to provide an improved method for controlling the output torque of an electric variable transmission.

This and other objects and advantages are achieved according to the invention, which provides a method for controlling an output torque of an electric variable transmission with a combustion engine and at least one electric motor. The combustion engine and the electric motor or motors may propel the output. The electric motors may also be run in a generator mode, thereby recuperating or regenerating a battery. Furthermore one of the electric motors may be in driving mode and at least partly provided with energy by the other motor, which is operating in a generator mode at the same time. In the electric variable transmission a revolution speed of the combustion engine may be changed by the combustion engine's torque as well as by the electric motor's torque.

The method according to the invention comprises the steps of:
  restricting the battery power to a maximum continuous battery power when the transmission is in a stationary operating point with a continuous revolution speed;
  raising the battery power and restricting it to a maximum transient battery power (greater than the maximum continuous battery power) in a non-stationary operating point, upon a request for changing the gear-ratio (ratio between transmission input and output-speed), or upon a request for changing the transmissions output revolution speed.

The method allows for a steadier and smoother characteristic of the transmission output torsion, thus providing a convenient driving impression. The method may also be applied to parallel hybrids, where the electric motor is used to support the synchronization of revolution speeds when changing gears. In this context, shorter cycle times may be achieved by a short-term increase of the battery power, depending on a requested revolution speed gradient.

The battery discharging power may be restricted to a maximum transient value when boosting in the non-stationary operating point, while the battery charging power may be restricted to a maximum transient value when recuperating in the non-stationary operating point.

The absolute values of the maximum transient battery discharging power and the maximum transient charging power may be different from each other or equal each other, as may be the maximum continuous battery discharging power and the maximum continuous battery charging power. Usually these limits are specified by the battery's manufacturer.

In a preferred embodiment of the invention the battery power required for boosting the electric motor, or the battery power that needs to be absorbed by the battery when recuperating, is calculated as the sum of the mechanical powers of the electric motors and an overall loss of power due to friction, heat, ohmic drop, battery losses and the like.

In the stationary operating point, the battery power required may be calculated by summing the transmission output power and the overall loss of power, and subtracting the power of the combustion engine.

In the non-stationary operating point the required battery power may be calculated by summing the transmission output power, the overall loss of power, and an inertia power required for compensating inertia operative in the transmission, and subtracting the power of the combustion engine. The inertia power may be known from a characteristic curve or map, depending on parameters such as input transmission revolution speed or a derivative thereof.

In a preferred embodiment the battery power required in the non-stationary operating point is calculated by summing the transmission output power, the overall loss of power, and a function of an inertia power required for compensating inertia operative in the transmission, and subtracting the power of the combustion engine.

In another preferred embodiment, the method may be applied to an electric variable transmission coupled to two electric motors (i.e., a so called split power transmission). It may also be applied in a hybrid vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE DRAWINGS

Figure 1:
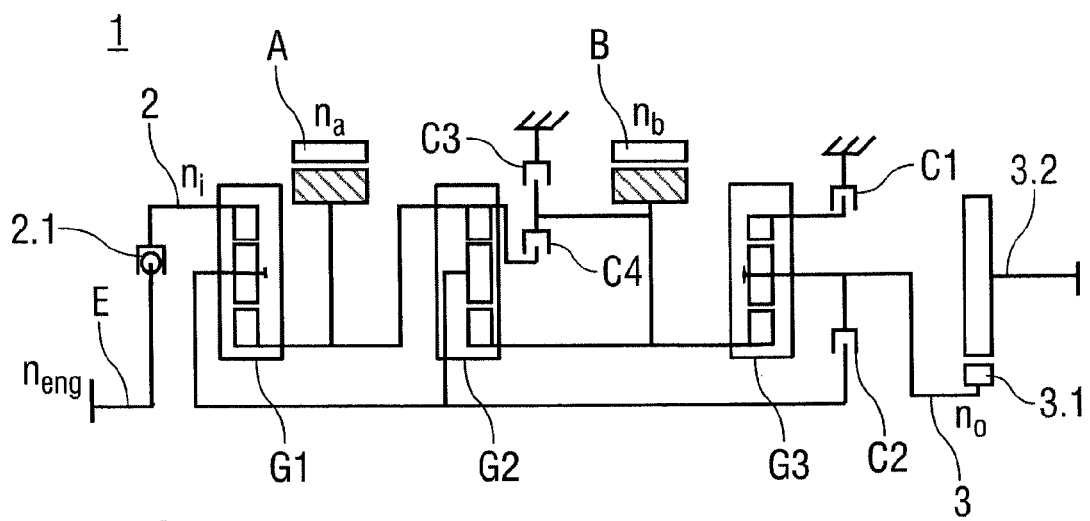
FIG. 1 is a schematic view of an electric variable transmission.

FIG. 1 shows a schematic view of an electric variable transmission (EVT) 1, which includes three planetary gear trains G1, G2, G3, four clutches C1, C2, C3, C4 and two electric motors A, B rotating with respective revolution speeds $n_A$, $n_B$. A combustion engine E rotating with a revolution speed $n_{eng}$ is connected to a transmission input 2 via a torsion damper 2.1. The transmission input 2 rotates with a revolution speed $n_i$ which is essentially equal to $n_{eng}$. A transmission output 3 rotating with a revolution speed $n_o$ is connected by a differential gear 3.1 to a wheel shaft 3.2.

Figure 2:
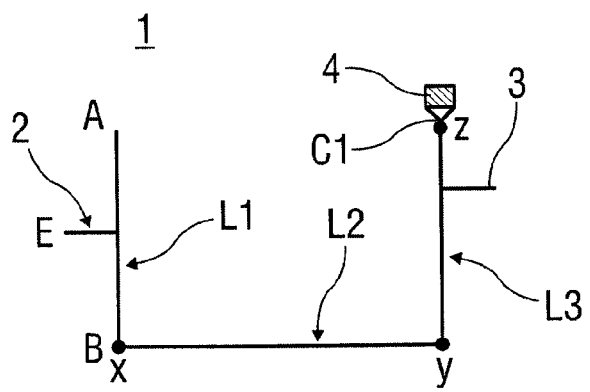
FIG. 2 is a lever diagram representation of the electric variable transmission from FIG. 1 in a static state, all speeds being zero.

The electric variable transmission may be depicted in a simplified way by a so called lever diagram shown in FIG. 2, in which the electric variable transmission is shown in a mode with only the clutch C1 closed and the other clutches C2, C3, C4 open (and therefore not shown). The electric motors A and B as well as the combustion engine are connected to a lever L1. A lever L2 is connected to lever L1 by a hinge x, at which the electric motor B is coupled to levers L1 and L2, as well.

Lever L2 is connected to a lever L3 by another hinge y. Lever L3 is attached to a housing 4 by another hinge z represented by the clutch C1. The transmission output 3 is coupled to lever 3.

Figure 3:
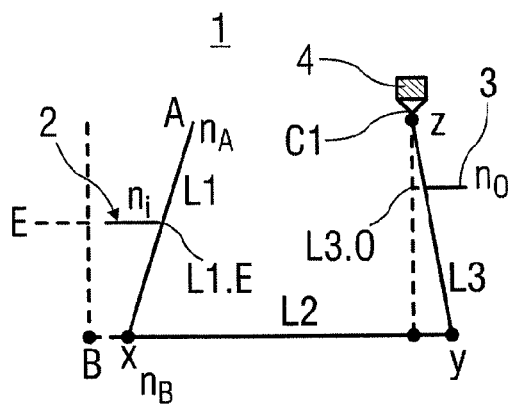
FIG. 3 is a lever diagram of the electric variable transmission with all inputs and outputs rotating.

FIG. 3 shows how revolution speeds can be represented in the lever diagram by shifting the levers L1, L2, L3 laterally with respect to the home position shown in FIG. 1. All points A, L1.E, x, y, L3.O shifted to the right represent positive revolution speeds. If the electric variable transmission 1 would be driven by the electric motor B only with the combustion engine E stalled, the lever L1 would pivot around point L1.E causing the electric motor A to rotate in the opposite direction, i.e. with a negative revolution speed $n_A$.

Negative revolution speeds would be indicated by shifting to the left.

Figure 4:
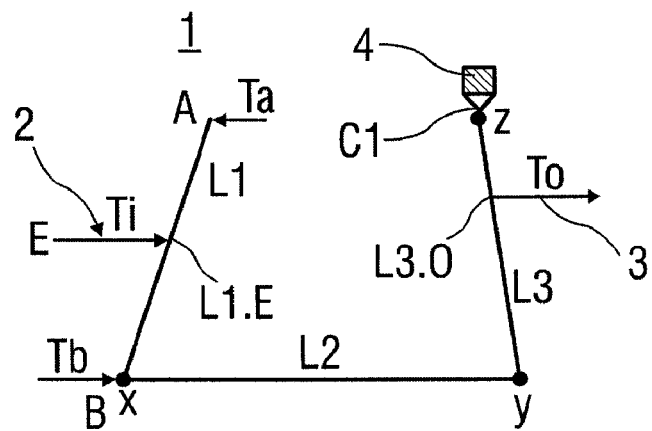
FIG. 4 is lever diagram of the electric variable transmission in a stationary operating point.

FIG. 4 is lever diagram of the electric variable transmission 1 in a stationary operating point. Stationary means that the combustion engine E at the transmission input 2 and the transmission output 3 both rotate with an essentially constant revolution speed. So do the electric motors A and B. All revolution speeds are positive. The electric motor A is in a generator mode, transforming mechanical energy into electrical energy; hence, a torque $T_A$ of motor A is negative. Consequently with negative torque $T_A$ and positive revolution speed, the mechanical power $P_{MtrA}$ of motor A is negative. At the same time the electric motor B is in motor mode, hence a torque $T_B$ of motor B is negative. Consequently with positive torque $T_B$ and positive revolution speed, the mechanical power $P_{MtrB}$ of motor B is positive.

The energy required for motor B may be at least partly provided by motor A. The remaining part of the energy may be drawn from a battery (not shown). The mechanical power $P_{Eng}$ of the combustion engine E is also positive since engine torque $T_i$ and revolution speed are positive. All torques $T_A$, $T_B$, $T_i$, To are indicated by arrows. If the energy gathered by motor A is greater than the energy required by motor B the extra energy would be used for charging the battery.

The transmission output power is given by equation 2.1:

$$P_{OUT} = P_{MtrA} + P_{MtrB} + P_{Eng} \quad (2.1)$$

The battery power $P_{Bat}$ due to charging or discharging the battery is given by equation 2.2:

$$P_{Bat} = P_{MtrA} + P_{MtrB} + P_{Loss} \quad (2.2)$$

with $P_{Loss}$ being the overall loss of power due to friction, heat, ohmic drop, battery losses and the like. Equation 2.3 results from equation 2.1 and 2.2:

$$P_{Out} = P_{Eng} + P_{Bat} - P_{Loss} \quad (2.3)$$

It can be seen that the transmission output power $P_{Out}$ depends on the available battery power $P_{Bat}$, which is limited by manufacturer specifications that must not be exceeded. It should be noted that $P_{Loss}$ also depends on $P_{Bat}$.

Figure 5:
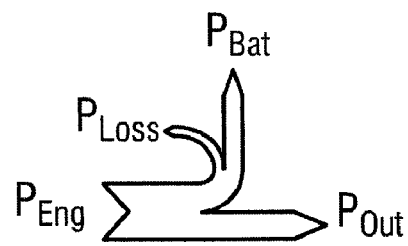
FIG. 5 is a power flux diagram for the stationary operating point in the case of recuperating.
Figure 6:
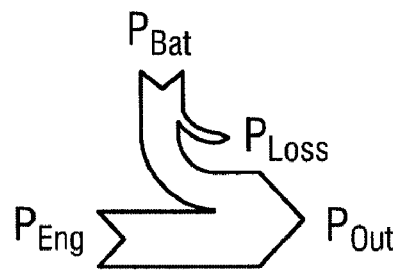
FIG. 6 is a power flux diagram for the stationary operating point in the case of boosting.

This becomes clear from the power flux diagrams shown for regenerating in FIG. 5 and for boosting in FIG. 6.

Setting the maximum continuous discharging power $P_{Bat\_max}$ of the battery into equation 2.3 yields the maximum continuous transmission output power $P_{Out\_max}$, which is the maximum power in the stationary operation point when boosting:

$$P_{Out\_max} = P_{Eng} + P_{Bat\_max} - P_{Loss} \quad (2.4)$$

Setting the maximum continuous charging power $P_{Bat\_min}$ of the battery into equation 2.3 yields the maximum continuous transmission output power $P_{Out\_max}$, which is the maximum power in the stationary operation point when recuperating:

$$P_{Out\_min} = P_{Eng} + P_{Bat\_min} - P_{Loss} \quad (2.5)$$

$P_{Bat\_max}$ and $P_{Bat\_min}$ on the one hand depend on manufacturer specifications due to the specific design of the battery. On the other hand they also depend on the current charge condition, temperature, battery voltage and the charging history (number of cycles, age, overcharging, overheating etc.). When controlling the actual battery power $P_{Bat}$ the limit values $P_{Bat\_min}$ and $P_{Bat\_max}$ specified by the manufacturer may be corrected with regard to these battery conditions. A typical value for $P_{Bat\_min}$ or $P_{Bat\_max}$ may be 40 kW.

Figure 7:
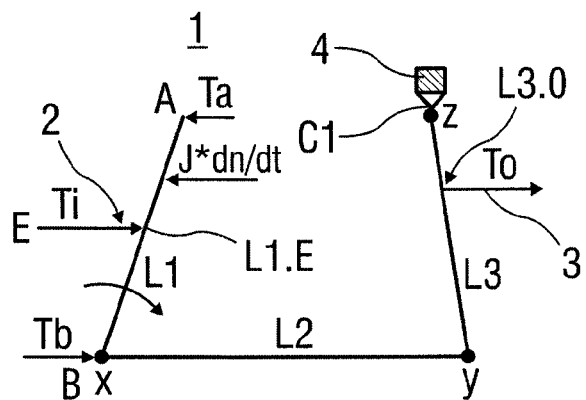
FIG. 7 is lever diagram of the electric variable transmission in a non-stationary or transient operating point.

FIG. 7 is lever diagram of the electric variable transmission 1 in a non-stationary operating point; that is, when a change of gear-ratio (ratio between input and output speed) is requested and the transmission input speed (L1.E) has to be in-/decreased, or when a change of revolution speed of the transmission output 3 is requested when the car is supposed to accelerate or to slow down. In this condition, portions of the power train of which the electric variable transmission 1 is a part, must be accelerated or slowed down, thus causing inertia effects, which must be accounted for as an additional torque $$J * \frac{dn}{dt}$$

acting on lever L1.

The resulting inertia power is given by equation 2.6:

$$P_{Inertia} = J * \frac{dn}{dt} * n \quad (2.6)$$

The transmission output power $P_{Out}$ in the non-stationary operating point is given by equation 2.7:

$$P_{Out} = P_{Eng} + P_{MtrA} + P_{MtrB} - P_{Inertia} \quad (2.7)$$

and combined with equation 2.2:

$$P_{Out} = P_{Eng} + P_{Bat} - P_{Loss} - P_{Inertia} \quad (2.8)$$

Figure 8:
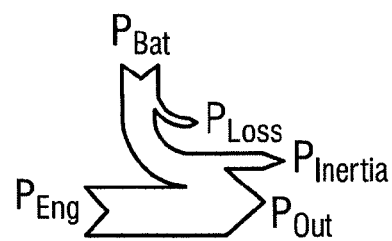
FIG. 8 is a power flux diagram for the non-stationary or transient operating point in the case of boosting.

The resulting power flux diagram for the non-stationary operating point is shown in FIG. 8 for boosting case.

Equations 2.9 and 2.10 hold for the maximum transient output transmission power in the instationary operation point when boosting and for the maximum transient output transmission power when recuperating:

$$P_{Out\_max} = P_{Eng} + P_{Bat\_max} - P_{Loss} - P_{Inertia} \quad (2.9)$$

$$P_{Out\_min} = P_{Eng} + P_{Bat\_min} - P_{Loss} - P_{Inertia} \quad (2.10)$$

If the actual battery power $P_{Bat}$ is close to one of the continuous limits $P_{Bat\_max}$ or $P_{Bat\_min}$, the inertia power can lead to fluctuations and non-stationary effects in the transmission output power $P_{Out\_max}$, $P_{Out\_min}$. These may be perceived by the driver and the passengers. Equation 2.11 holds for the power fluctuations at the transmission output 3 due to inertia effects.

$$\Delta P_{Out} = P_{Inertia} \quad (2.11)$$

The power difference $\Delta P_{Out}$ can be reduced or avoided by adapting either the power $P_{Eng}$ of the combustion engine E, or the permitted battery power $P_{Bat}$. Since the combustion engine E is inert compared to the electric motors A, B it is more effective to adapt the battery power $P_{Bat}$ in order to compensate the dynamic effects. Battery manufacturers have defined dynamic battery limits which exceed the continuous limits, for example by adding 10 kW to the continuous limits $P_{Bat\_min}$ or $P_{Bat\_max}$. The maximum transient discharging power is given by:

$$P_{Bat\_max}^* = P_{Bat\_max} + \Delta P_{Bat\_max\_dyn} \quad (2.12)$$

The maximum transient charging power is given by:

$$P_{Bat\_min}^* = P_{Bat\_min} + \Delta P_{Bat\_min\_dyn} \quad (2.13)$$

In general, equation 2.14 holds:

$$\Delta P_{Bat\_max\_dyn} = \Delta P_{Bat\_min\_dyn} = P_{Inertia} = J * \frac{dn}{dt} * n \quad (2.14)$$

In order to fine tune the accelerating and decelerating characteristics, the difference added to the continuous battery limits can be a function of the inertia power:

$$\Delta P_{Bat\_max\_dyn} = f1(P_{Inertia}) = f1\left(J * \frac{dn}{dt} * n\right) \quad (2.15)$$

$$\Delta P_{Bat\_min\_dyn} = f2(P_{Inertia}) = f2\left(J * \frac{dn}{dt} * n\right) \quad (2.16)$$

Thus the additionally enabled battery power $\Delta P_{Bat\_max\_dyn}$, $\Delta P_{Bat\_min\_dyn}$ can be limited in order to protect the battery from damage or to provide smooth accelerating or decelerating characteristics.

Figure 9:
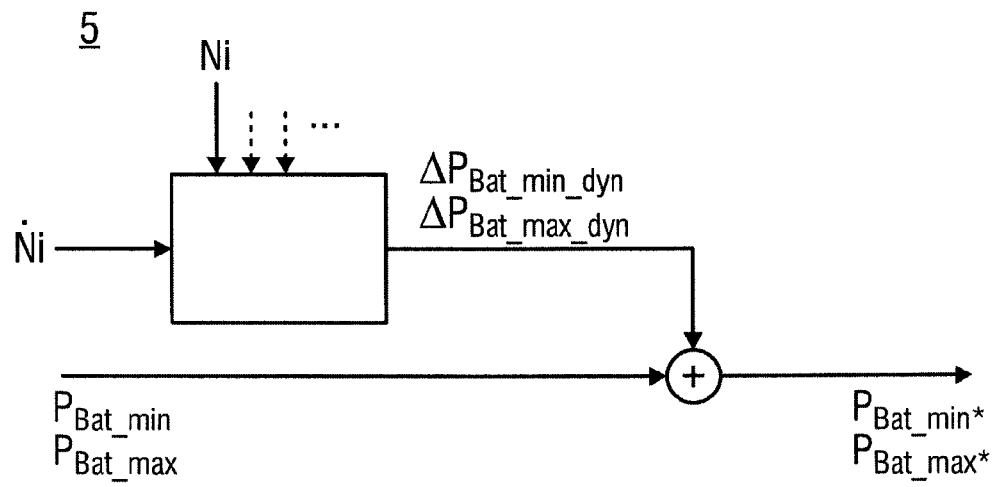
FIG. 9 is a detail of a control circuit to control maximum and minimum battery power limits for the electric variable transmission.

FIG. 9 is a detail of a control circuit 5 for controlling the output torque To of the electric variable transmission 1. The dynamic battery limits $P_{Bat\_min}^*$ and $P_{Bat\_max}^*$ are determined by adding the power differences $\Delta P_{Bat\_min\_dyn}$ or $\Delta P_{Bat\_max\_dyn}$, respectively to the continuous battery limits $P_{Bat\_min}$ and $P_{Bat\_max}$. The power differences $\Delta P_{Bat\_min\_dyn}$ or $\Delta P_{Bat\_max\_dyn}$ depend on the input revolution speed $N_i$ as well as on the first derivative $\dot{N}_i$ of $N_i$. $N_i$ may be used instead of n and $\dot{N}_i$ instead of $$\frac{dn}{dt}$$

since these measures are mutually dependent.

There may be more input measures taken into consideration for determining the power differences $\Delta P_{Bat\_min\_dyn}$, $\Delta P_{Bat\_max\_dyn}$.

As noted previously, the method may also be applied in a hybrid vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an output torque of an electric variable transmission having an input that is coupled to a combustion engine, and at least one electric motor that is feedable by a battery, and is able to recuperate energy into the battery, said method comprising:

limiting battery power to a maximum continuous battery power when the transmission is in a stationary operating point with a continuous revolution speed;

raising the battery power and limiting it to a maximum transient battery power which is greater than the maximum continuous battery power in a non-stationary operating point, upon a request for changing the gear-ratio between transmission input and output-speed, or upon a request for changing the transmissions output revolution speed.

2. The method according to claim 1, wherein battery discharging power is restricted to a maximum transient battery discharging power when boosting.

3. The method according to claim 2, wherein an absolute value of the maximum transient battery charging power equals an absolute value of the maximum transient battery discharging power.

4. The method according to claim 2, wherein an absolute value of the maximum transient battery charging power differs from an absolute value of the maximum transient battery discharging power.

5. The method according to claim 1, wherein battery charging power is restricted to a maximum transient charging power when recuperating.

6. The method according to claim 5, wherein an absolute value of the maximum transient battery charging power equals an absolute value of the maximum transient battery discharging power.

7. The method according to claim 5, wherein an absolute value of the maximum transient battery charging power differs from an absolute value of the maximum transient battery discharging power.

8. The method according to claim 1, wherein the battery power is calculated as the sum of mechanical powers of the electric motors and an overall loss of power due to friction, heat, ohmic drop and battery losses.

9. The method according to claim 8, wherein battery power required in the stationary operating point is calculated by summing transmission output power, and an overall loss of power, and subtracting power of the combustion engine.

10. The method according to claim 8, wherein battery power required in the non-stationary operating point is calculated by summing transmission output power, an overall loss of power and an inertia power required for compensating inertia operative in the transmission, and subtracting a power of the combustion engine.

11. The method according to claim 8, wherein battery power required in the non-stationary operating point is calculated by summing transmission output power, an overall loss of power and a function of an inertia power required for compensating inertia operative in the transmission, and subtracting a power of the combustion engine.

12. The method according to claim 1, wherein said electric variable transmission is coupled to two electric motors.

13. The method according to claim 1, wherein said electric variable transmission is in a hybrid vehicle.

* * * * *